(12) United States Patent
Wang et al.

(10) Patent No.: US 12,556,391 B2
(45) Date of Patent: Feb. 17, 2026

(54) SYMMETRICAL ISSUANCE AND DESTRUCTION SYSTEM FOR RIGHT AND OBLIGATION TOKENS AND METHOD THEREOF

(71) Applicant: Skychain CO., LTD., Taipei (TW)

(72) Inventors: Chen-Hsuan Wang, Taipei (TW); Jiann-Min Yang, Taipei (TW); Scott Miau, Taipei (TW)

(73) Assignee: Skychain CO., LTD., Taipei (TW)

( * ) Notice: Subject to any disclaimer, the term of this patent is extended or adjusted under 35 U.S.C. 154(b) by 0 days.

(21) Appl. No.: 18/585,329

(22) Filed: Feb. 23, 2024

(65) Prior Publication Data

US 2025/0274285 A1    Aug. 28, 2025

(30) Foreign Application Priority Data

Feb. 23, 2023  (TW) ................................ 112106735

(51) Int. Cl.
*H04L 9/32*     (2006.01)
*H04L 9/00*     (2022.01)

(52) U.S. Cl.
CPC .............. *H04L 9/3213* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2019/0140935 A1* | 5/2019 | Kikinis | G06F 30/20 |
| 2019/0303887 A1* | 10/2019 | Wright | G06Q 20/3829 |
| 2019/0356473 A1* | 11/2019 | Rosenoer | G06Q 20/065 |
| 2020/0175506 A1* | 6/2020 | Snow | G06Q 20/0655 |
| 2020/0327609 A1* | 10/2020 | Dubrofsky | G06Q 40/06 |
| 2021/0110386 A1* | 4/2021 | Meyer | G06Q 20/02 |
| 2021/0326815 A1* | 10/2021 | Brody | H04L 9/3239 |
| 2022/0027867 A1* | 1/2022 | Long | G06Q 20/02 |

* cited by examiner

*Primary Examiner* — Kaveh Abrishamkar
(74) *Attorney, Agent, or Firm* — Chih Feng Yeh; Yongjean Consulting Inc.

(57) ABSTRACT

A symmetrical issuance and destruction system for right and obligation tokens are disclosed. In the system, obligation tokens corresponding to obligations are issued through an obligation token contract and delivered to a right token contract, and the right tokens are symmetrically generated and delivered to the right holder host through the right token contract. The symmetry between the obligation tokens and the right tokens is maintained when there is a change in the quantity of the obligation tokens or the right tokens. Therefore, the technical effect of improving the usability of blockchain tokens can be achieved.

10 Claims, 8 Drawing Sheets

SYMMETRICAL ISSUANCE AND DESTRUCTION SYSTEM FOR RIGHT AND OBLIGATION TOKENS AND METHOD THEREOF

CROSS-REFERENCE STATEMENT

The present application is based on, and claims priority from, TAIWAN Patent Application Serial Number 112106735, filed Feb. 23, 2023, the disclosure of which is hereby incorporated by reference herein in its entirety.

BACKGROUND

1. Technique Field

The present invention relates to a token issuance and destruction system and a method thereof, and particularly to a symmetrical issuance and destruction system for right and obligation tokens, and a method thereof.

2. Related Art

In recent years, with the widespread adoption and rapid development of blockchain, various token applications have emerged.

Generally speaking, in the conventional architecture of blockchain, only specific identities have corresponding rights, such as the right of operating the native currency of the blockchain or modifying data within a smart contract. However, conventional blockchain tokens are primarily focused on the implementation of rights and lack the implementation of obligations or responsibilities. Taking a creditor-debtor relationship as an example, a creditor's right is generated only when there is a commitment from the debtor, and the existence of the creditor's right can be impaired due to the extinction of the debt or obligation, such as when the debt has been repaid or the debtor is unable to fulfill the debt. In such cases, a symmetrical mechanism is needed to simultaneously handle the occurrence and extinction of rights and obligations. In other words, for the simultaneous existence of distributed responsibilities and rights in business, the blockchain tokens having only rights without responsibilities or obligations are not applicable in various dynamic business environments, and it results in poor usability of blockchain tokens.

Therefore, what is needed is to develop an improved solution to solve the problem of poor usability of blockchain tokens.

SUMMARY

An objective of the present invention is to disclose a symmetrical issuance and destruction system for right and obligation tokens and a method thereof, to solve the above-mentioned convention problem.

In order to achieve the objective, the present invention provides a symmetrical issuance and destruction system for right and obligation tokens. The symmetrical issuance and destruction system includes a blockchain network, the blockchain network includes node hosts, wherein N obligation provider hosts and M right holder hosts are permitted to access the blockchain network and perform identification and right transfer through blockchain addresses thereof, wherein each of N and M is a positive integer. Each of the node hosts includes at least one processor, a storage element, and a plurality of smart contracts. The storage element is configured to store a distributed ledge. Each of the plurality of smart contracts includes an obligation token contract and at least one right token contract, each of the obligation token contract and at least one right token contract includes computer instructions, and the plurality of smart contracts are stored in the distributed ledger and executed by the at least one processor. The obligation token contract includes an obligation token issuance module and a first right and obligation symmetry module. When the N obligation provider hosts call the obligation token issuance module, the obligation token issuance module issues at least one obligation token representing obligation, and deliver the at least one issued obligation token to the right token contract for holding and management. The first right and obligation symmetry module is configured to destroy the issued obligation token or issue more obligation token for maintaining symmetry between a quantity of the issued obligation token in the obligation token contract and a quantity of at least one issued right token in the right token contract. The right token contract includes an obligation token management module, a right token issuance module and a second right and obligation symmetry module. The obligation token management module is connected to the obligation token contract, wherein the obligation token contract calls the obligation token management module to transfer the obligation token to the right token contract. The right token issuance module is connected to the obligation token management module, wherein the obligation token management module calls the right token issuance module to issue the right tokens having a quantity with symmetry to the quantity of the obligation token received by the right token contract, and deliver the issued right token to at least one of the M right holder hosts. The second right and obligation symmetry module and the first right and obligation symmetry module are configured to call with each other to continuously destroy the issued right tokens and issue more right tokens for maintaining symmetry between a quantity of the issued obligation token in the obligation token contract and a quantity of at least one issued right token in the right token contract.

In order to achieve the objective, the present invention provides a symmetrical issuance and destruction method for right and obligation tokens, and the symmetrical issuance and destruction method include steps of: providing a blockchain network including a node hosts, permitting N obligation provider hosts and M right holder hosts to access the blockchain network and perform identification and right transfer through blockchain addresses thereof, wherein each of the node hosts includes at least one processor, a distributed ledger stored in a storage element, and an obligation token contract and at least one right token contract which are stored in the distributed ledger and includes computer instructions, wherein each of N and M is a positive integer; calling the obligation token contract to issue at least one obligation token representing obligation and deliver the issued obligation tokens to the right token contract for holding and management, by the N obligation provider hosts; issuing at least one right token having a quantity symmetrical to a quantity of the received obligation tokens and delivering the issued at least one right token to at least one of the M right holder hosts, by the right token contract; continuously destroying the issued obligation token or issuing more the obligation token to maintain symmetry between the quantity of the issued obligation tokens in the obligation token contract and the quantity of the at least one issued right token in the right token contract, and continuously destroying the issued right token or issuing more the right token to maintain symmetry between the quantity of the issued obligation tokens in the obligation token contract and the quantity of the at least one issued right token in the right token contract.

According to the above-mentioned system and method of the present invention, the difference between the conventional technology and the present invention is that the obligation tokens corresponding to obligations are issued through the obligation token contract and delivered to the right token contract, and the right tokens are symmetrically generated and delivered to the right holder host through the right token contract, so that the symmetry between the obligation tokens and the right tokens can be maintained when there is a change in the quantity of the obligation tokens or the right tokens. Therefore, the above-mentioned technical solution of the present invention is able to solve the convention problem, so as to achieve the technical effect of improving the usability of blockchain tokens.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
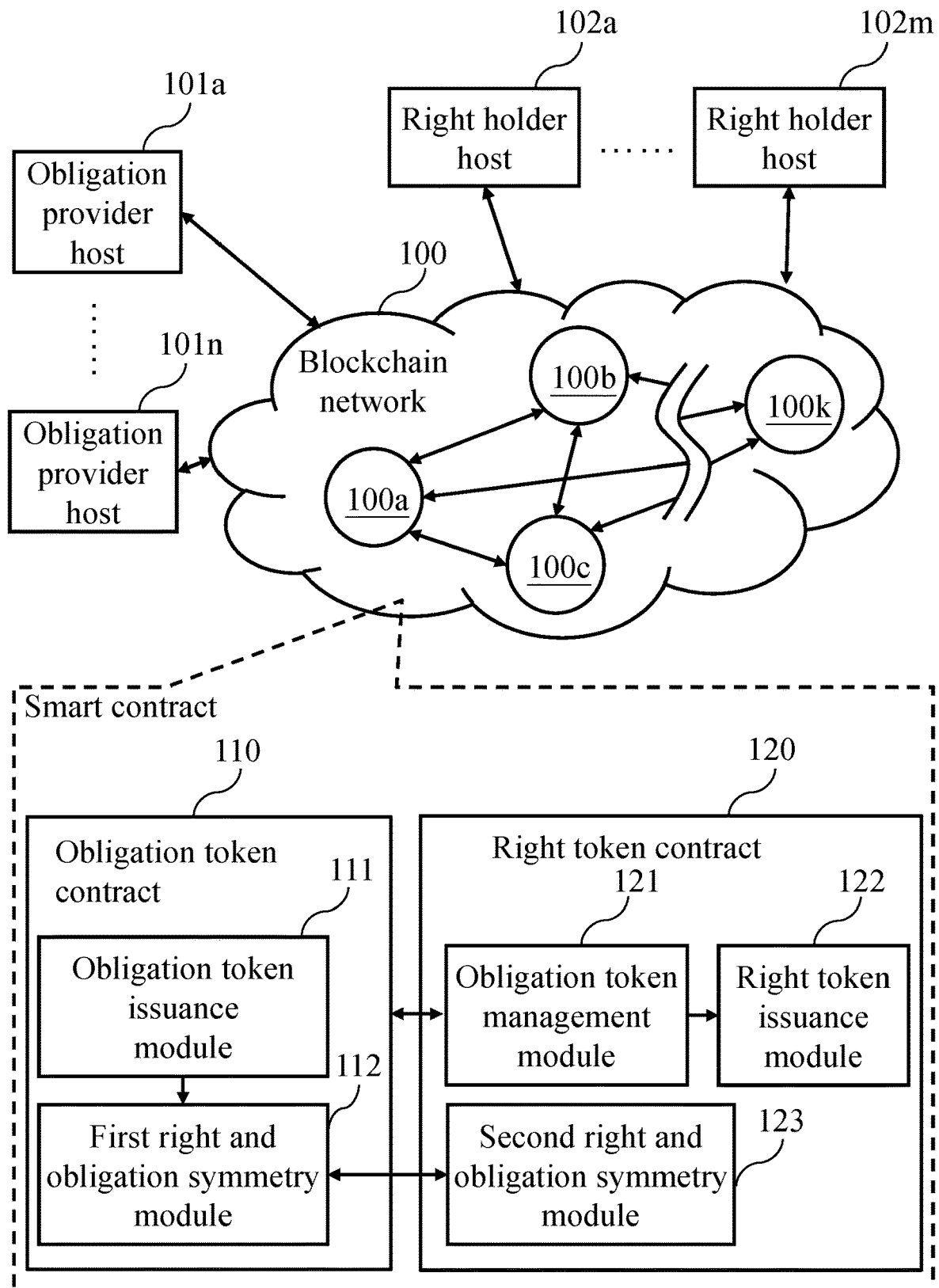
FIG. 1 is a schematic view of a symmetrical issuance and destruction system for right and obligation tokens, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first,' 'second,' 'third,' and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include," and variations such as "comprises," "comprising," "includes," or "including," will be acknowledged to imply the inclusion of stated elements but not the exclusion of any other elements.

Before the symmetrical issuance and destruction system and method for right and obligation tokens disclosed in the present invention are explained, the terms defined by the present invention are explained. The term "obligation" in the present invention refers to obligations such as payment obligations, risk-sharing obligations, or debt repayment obligations, and the quantity of obligations is positively correlated with the quantity of obligation tokens; the term "right" refers to rights such as the right to obtain funds, the right to demand risk-sharing, or the right to recover debt loans; these obligations and rights are implemented through blockchain tokens, the obligation tokens correspond to the right tokens, and the quantity of rights is positively correlated with the quantity of right tokens. Additionally, the obligation tokens from the same obligor can be considered as the same category or classification, and the right tokens are not classified. In other words, the quantity of the issued right tokens corresponds to the total quantity of the issued obligation tokens in all classifications.

The symmetrical issuance and destruction system for right and obligation tokens will be explained in the following paragraphs. Please refer to FIG. 1. FIG. 1 is a system block diagram of the symmetrical issuance and destruction system for right and obligation tokens in the present invention. The system includes a blockchain network 100. The blockchain network 100 includes multiple node hosts 100a~100k, and N obligation provider hosts 101a~101n and M right holder hosts 102a~102m are allowed to access the blockchain network 100 and perform identification and right transfer through their respective blockchain addresses. N and M are positive integers. Each of the node hosts 100a~100k includes one or more processors, a storage element, and a plurality of smart contracts. The processor is an electronic circuit capable of executing computer instructions to manipulate external data (such as data from memory or other data streams) and produce output. Multiple processors are able to perform parallel computation d to enhance execution performance. Different hosts can be connected through wired networks (e.g., Ethernet) or wireless networks (e.g., Wi-Fi, ZigBee, CoAP, MQTT) or similar technologies for data transmission. Furthermore, the N obligation provider hosts 101a~101n and M right holder hosts 102a~102m are allowed to use the same blockchain address. The right tokens are distributed to the N obligation provider hosts 101a~101n based on a classification ratio of the right tokens, to make the N obligation provider hosts 101a~101n simultaneously become the M right holder hosts 102a~102m. In practice, the obligation provider hosts 101a~101n can be considered as roles with obligations that must be fulfilled, such as debtors in lending scenarios or participants responsible for risk-sharing in P2P lending mechanisms, a participant responsible for payment in a rotating savings and credit association. The right holder hosts 102a~102m can be considered as roles with rights that can be claimed or exercised (such as creditors in lending scenarios), or roles with rights in P2P obligations and rights mixing mechanisms (such as individuals seeking assistance in risk-sharing), or participants withdrawing funds in rotating savings and credit mechanism relying on right tokens (such as acquiring right tokens through secondary market transactions). It should be noted that each of the N obligation provider hosts 101a~101n and the M right holder hosts 102a~102m has one or more processors and a storage element (similar to the node hosts 100a~100k), and is operated based on the represented roles. Additionally, the N obligation provider hosts 101a~101n and the M right holder hosts 102a~102m can be computing devices (e.g., computers, smartphones, tablets, servers) that are able to access the blockchain network 100; the N obligation provider hosts 101a~101n and the M right holder hosts 102a~102m also can be the node hosts 100a~100k, and the main difference lies in whether each of the N obligation provider hosts 101a~101n and the M right holder hosts 102a~102m possess a distributed ledger for storing the plurality of smart contracts.

The storage element is used to store the distributed ledger, which records all blockchain transactions and is collectively maintained and updated by all node hosts 100a~100k. Each blockchain transaction includes the blockchain addresses of a source and a destination. The blockchain addresses are used for identification and right transfer. In practice, a blockchain address is a unique string consisting of letters and numbers, such as "0x1eafe . . . ". Due to its uniqueness, the blockchain address can be used for identification and right transfer, such as receiving and sending tokens representing rights. These tokens can be freely traded.

The smart contract is stored in the distributed ledger and executed by one or more processors. The smart contract includes an obligation token contract 110 and a right token contract 120 which include multiple computer instructions. The obligation token contract 110 includes an obligation token issuance module 111 and a first right and obligation symmetry module 112. The obligation token issuance module 111 allows the N obligation provider hosts 101a~101n to call it to issue corresponding obligation tokens representing obligations and deliver all issued obligation tokens to the right token contract 120 for holding and management.

In practice, the above-mentioned call operation can be implemented through an application programming interface (API) of the smart contract, and the delivery can be achieved through blockchain transactions. In practice, the obligation token contract 110 can be a classification token contract based on the ERC1155 standard or a composite contract composed of multiple replaceable token contracts based on the ERC20 standard. The right token contract 120 can be a general replaceable token contract based on the ERC20 standard.

The first right and obligation symmetry module 112 is configured to increase the issuance of obligation tokens or destroy the issued obligation tokens to maintain the symmetry between the quantity of obligation tokens in the obligation token contract 110 and the quantity of right tokens in the right token contract 120. For example, in the case of having only one obligation provider host 101a and one right holder host 102a, when the quantity of the right tokens is 5 and the quantity of the obligation tokens is 3, the first right and obligation symmetry module 112 can issue 2 obligation tokens to achieve symmetry; when the quantity of right tokens is 5 and the quantity of obligation tokens is 9, the first right and obligation symmetry module 112 can destroy 4 obligation tokens to achieve symmetry.

It should be noted that when multiple right token contracts 120 exist, the obligation token contract 110 can correspond to the multiple right token contracts 120. Each right token contract 120 includes a symmetry destruction rule, which allows the obligation tokens to be allocated or sorted to each right token contract 120 based on the symmetry destruction rule. The obligation token contract 110 also allows the average delivery of obligation tokens of different types (such as the obligation tokens issued by different obligation provider hosts 101a~101n) to multiple right token contracts 120. In practice, each right token contract 120 can be fine-tuned based on the symmetry destruction rule, and the quantity of obligation tokens totally received by each right token contract 120 from the obligation token contract 110 can be different.

The right token contract 120 includes an obligation token management module 121, a right token issuance module 122, and a second right and obligation symmetry module 123. The obligation token management module 121 is connected to the obligation token contract 110, the obligation token contract 110 can call the obligation token management module 121 to transfer the obligation tokens to the right token contract 120. Similarly, the call function can be implemented through an API, and the transfer can be implemented through blockchain transactions.

The right token issuance module 122 is connected to the obligation token management module 121, the obligation token management module 121 can call the right token issuance module 122 to issue a symmetric quantity of right tokens based on the quantity of obligation tokens received by the right token contract 120, to at least one of the M right holder hosts 102a~102m. For example, in a condition that the right token contract 120 receives 500 obligation tokens, the right token issuance module 122 issues the same quantity of right tokens (that is, 500 right tokens) and distributes these right tokens evenly among all the right holder hosts 102a~102m, or allocate them to a part of the right holder hosts 102a~102m.

The second right and obligation symmetry module 123 and the first right and obligation symmetry module 112 can call each other to continuously increase the issuance of the right tokens or destroy the issued right tokens to maintain the issuance quantity of the right tokens in the right token contract 120 symmetric to the quantity of the issued obligation tokens in the obligation token contract 110. In practice, the maintenance can include symmetrically increasing the obligation tokens and the right tokens, destroying the right tokens held by the M right holder hosts on average corresponding to the obligation tokens, or destroying the obligation tokens on average based on the right tokens. Generally, the quantity of obligation tokens destroyed corresponds to the quantity of right tokens destroyed, and the quantity of right tokens increased corresponds to the quantity of obligation tokens increased, and vice versa. Additionally, when the obligation tokens decrease, the right tokens held by the original obligation provider host can be destroyed first. When the quantity of destroyed right tokens is lower than the quantity of right tokens that should be destroyed, the remaining quantity to be destroyed can be evenly distributed among the M right holder hosts. Examples of various destruction methods will be further illustrated in the following paragraphs.

It is to be particularly noted that, in actual implementation, the modules of the present invention can be implemented by various manners, including software, hardware or any combination thereof, for example, in an embodiment, the module can be implemented by software and hardware, or one of software and hardware. Furthermore, the present invention can be implemented fully or partly based on hardware, for example, one or more module of the system can be implemented by integrated circuit chip, system on chip (SOC), a complex programmable logic device (CPLD), or a field programmable gate array (FPGA). The concept of the present invention can be implemented by a system, a method and/or a computer program. The computer program can include computer-readable storage medium which records computer readable program instructions, and the processor can execute the computer readable program instructions to implement concepts of the present invention. The computer-readable storage medium can be a tangible apparatus for holding and storing the instructions executable of an instruction executing apparatus. Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc, or any appropriate combination thereof, but this exemplary list is not an exhaustive list. The computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2:
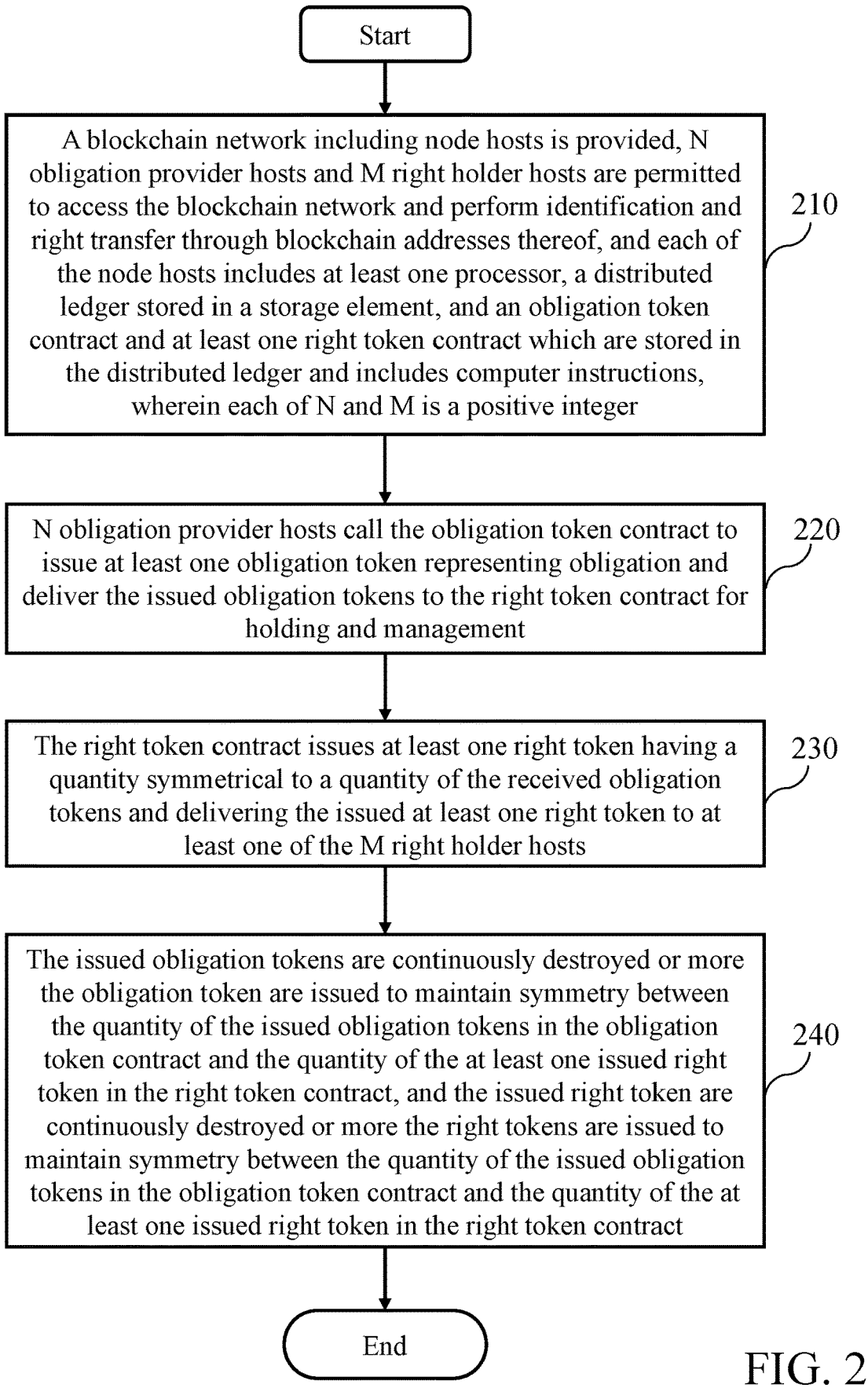
FIG. 2 is a flow chart of a symmetrical issuance and destruction method for right and obligation tokens, according to the present invention.

Please refer to FIG. 2. FIG. 2 is a flow chart of a symmetrical issuance and destruction method for right and obligation tokens, according to the present invention. The symmetrical issuance and destruction method includes the following steps. In a step 210, a blockchain network 100 including node hosts 100a~100k is provided, N obligation provider hosts 101a~101n and M right holder hosts 102a~102m are permitted to access the blockchain network 100 and perform identification and right transfer through blockchain addresses thereof, and each of the node hosts 100a~100k includes at least one processor, a distributed ledger stored in a storage element, and an obligation token contract 110 and at least one right token contract 120 which are stored in the distributed ledger and includes computer instructions, wherein each of N and M is a positive integer. In a step 220, the N obligation provider hosts 101a~101n call the obligation token contract 110 to issue at least one obligation token representing obligation and deliver the issued obligation tokens to the right token contract 120 for holding and management. In a step 230, the right token contract 120 issues at least one right token having a quantity symmetrical to a quantity of the received obligation tokens and delivering the issued at least one right token to at least one of the M right holder hosts 102a~102m. In a step 240, the issued obligation tokens are continuously destroyed or more the obligation token are issued to maintain symmetry between the quantity of the issued obligation tokens in the obligation token contract and the quantity of the at least one issued right token in the right token contract, and the issued right token are continuously destroyed or more the right tokens are issued to maintain symmetry between the quantity of the issued obligation tokens in the obligation token contract and the quantity of the at least one issued right token in the right token contract. According to the above-mentioned steps, the obligation tokens corresponding to obligations are issued through the obligation token contract and delivered to the right token contract, and the right tokens are symmetrically generated and delivered to the right holder host through the right token contract, so that the symmetry between the obligation tokens and the right tokens can be maintained when there is a change in the quantity of the obligation tokens or the right tokens.

Figure 3:
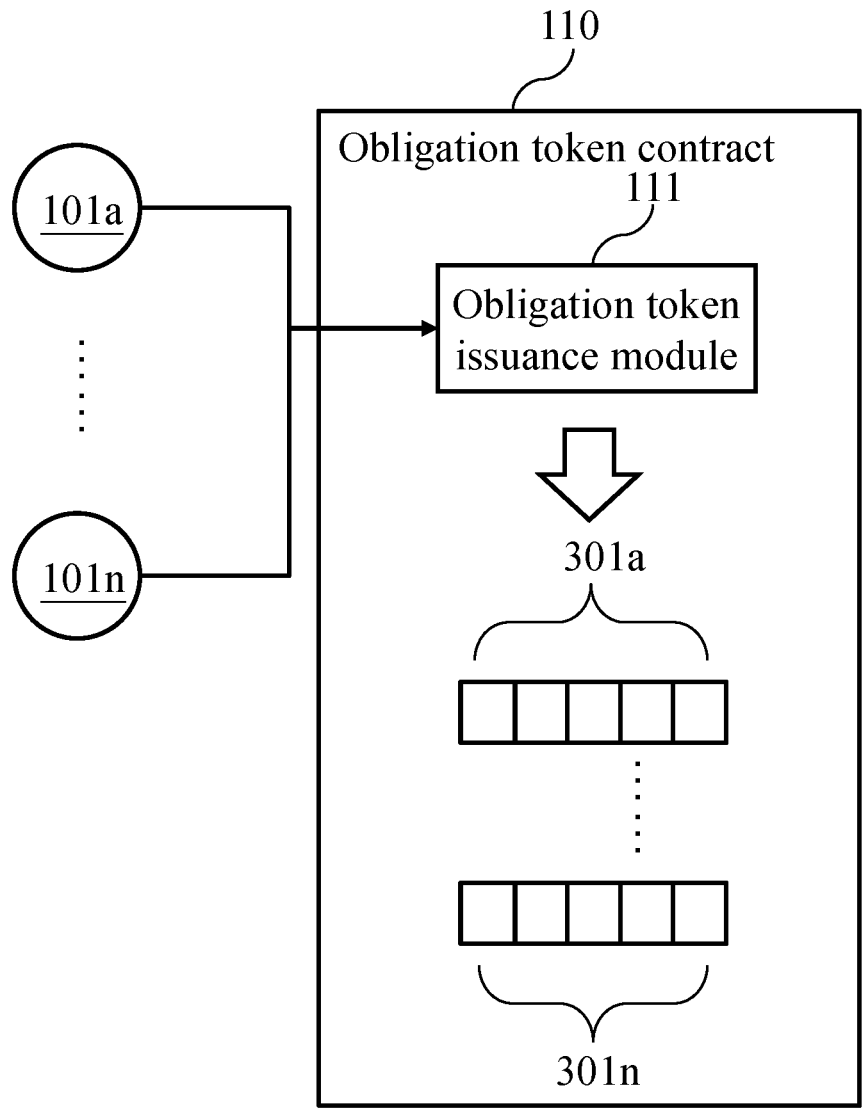
FIG. 3 is a schematic view of an operation of issuing obligation tokens representing obligation, in the application of the present invention.

With reference to FIG. 3 to FIG. 8, the following explanation is provided in the form of an exemplary implementation. Please refer to FIG. 3. FIG. 3 is a schematic view illustrating the obligation tokens representing obligations in the application of the present invention. In a condition that there are N obligation provider hosts 101a~101n, when issuing obligation tokens representing obligations, the obligation provider hosts 101a~101n needs to call the obligation token contracts 110 to issue the corresponding obligation tokens 301a~301n, representing the obligations, through the obligation token issuance module 111, respectively. As shown in FIG. 3, when the obligation provider host 101a recognizes an obligation, the obligation provider host 101a calls the obligation token contract 110 to issue the multiple obligation tokens 301a corresponding to the obligation, and so on; when the obligation provider host 101*n* recognizes an obligation, the obligation provider host 101*n* calls the obligation token contract 110 to issue the multiple obligation tokens 301*n* corresponding to the obligation. All the issued obligation tokens 301*a*~301*n* are delivered to the right token contract 120 for holding and management.

Figure 4:
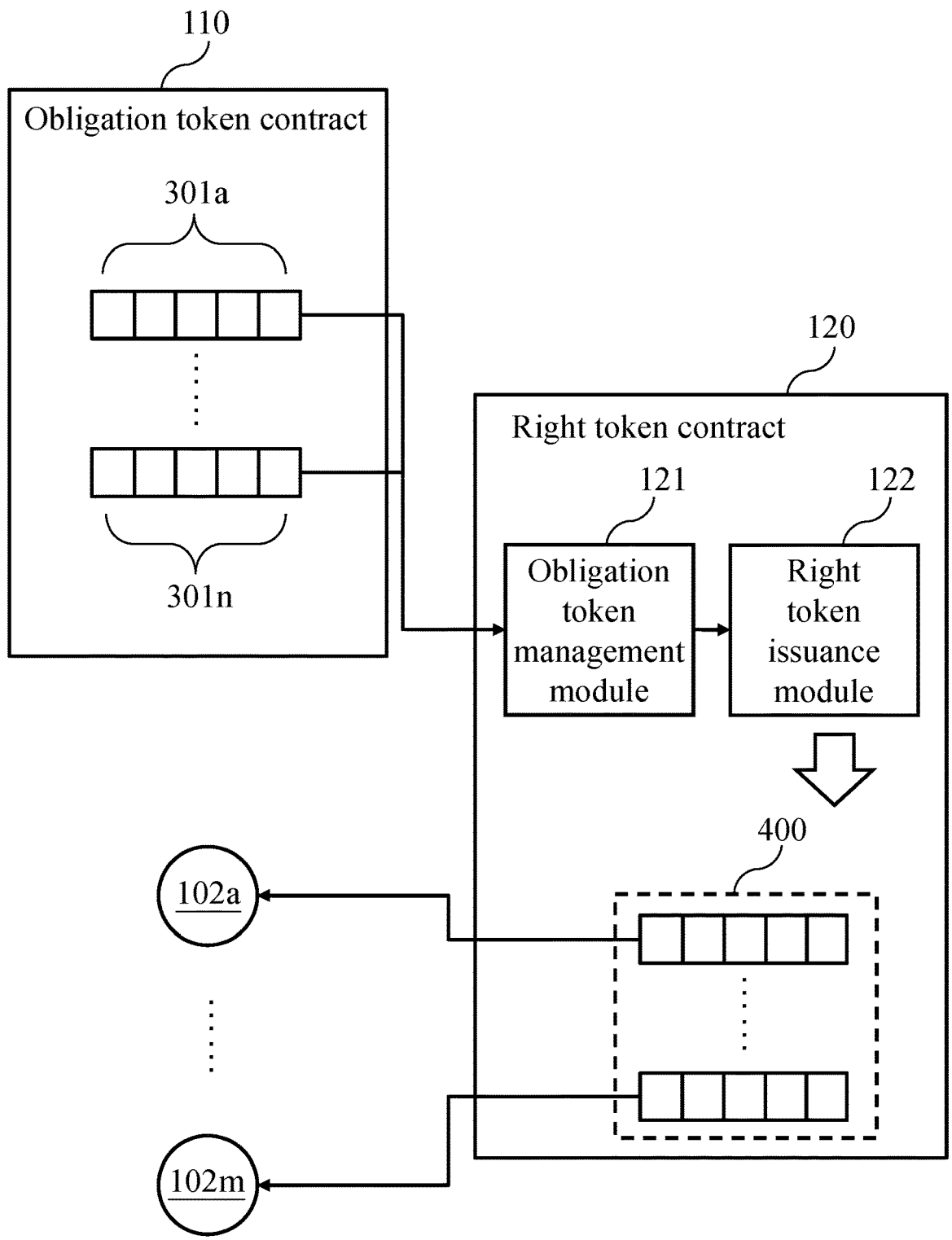
FIG. 4 is a schematic view of an operation of issuing right tokens in the application of the present invention.

Please refer to FIG. 4. FIG. 4 is a schematic view illustrating the issuance of right tokens in the application of the present invention. In practice, the obligation token management module 121 of the right token contract 120 is connected to the obligation token contract 110, the obligation token contract 110 can call the obligation token management module 121 to perform the transfer of the obligation tokens 301*a*~301*n* from the obligation token contract 110 to the right token contract 120. When the right token contract 120 receives all the delivered (or transferred) obligation tokens 301*a*~301*n* from the obligation token contract 110, the obligation token management module 121 of the right token contract 120 calls the right token issuance module 122 to issue a symmetric quantity of right tokens 400 to at least one of the M right holder hosts 102*a*~102*m* based on the received quantity of obligation tokens 301*a*~301*n*. In a rotating savings and credit association or risk-sharing scenario, one of the right holder hosts 102*a*~102*m* and one of the obligation provider hosts 101*a*~101*n* can be different roles of the same entity (such as the entity using the same address), and the right tokens 400 can be distributed to the obligation provider hosts 101*a*~101*n* based on the classification (or source) ratio of the obligation tokens, to make the obligation provider hosts 101*a*~101*n* receiving the right tokens 400 become the right holder hosts 102*a*~102*m*. The ratio can be set in the right token issuance module 122 of the right token contract 120.

Figure 5:
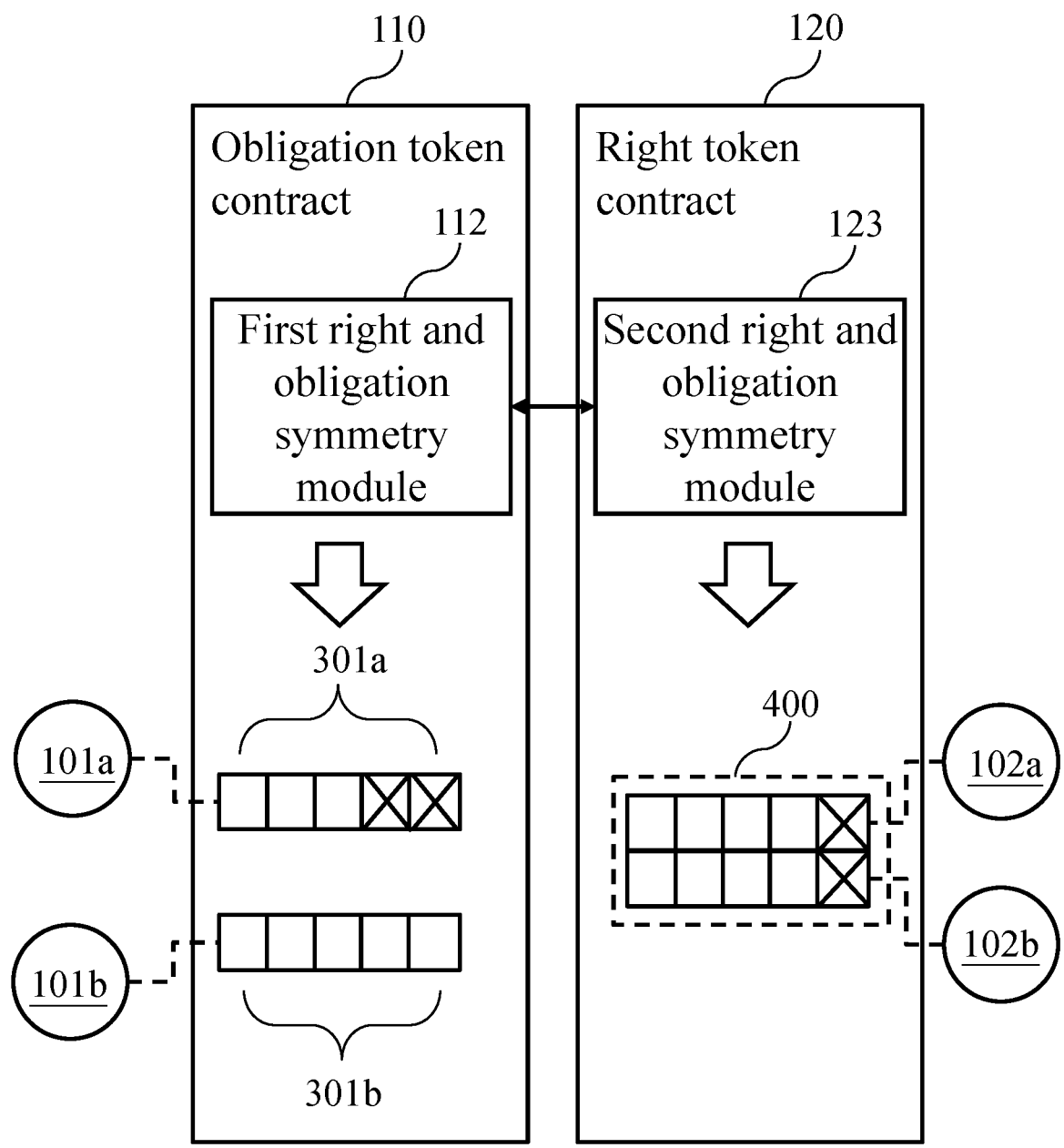
FIG. 5 is a schematic view illustrating a first embodiment of the symmetric relationship between right and obligation tokens in the application of the present invention.

Please refer to FIG. 5. FIG. 5 is a schematic view illustrating a first embodiment of the symmetric relationship between right and obligation tokens in the application of the present invention. In a condition that there are two obligation provider hosts 101*a* and 101*b*, and two right holder hosts 102*a* and 102*b*, when the obligation of the obligation provider hosts 101*a* decreases, the corresponding ratio (such as 40%) of the obligation tokens 301*a* should be destroyed, and it causes a proportional decrease in rights, so a proportional quantity of the right tokens 400 should be destroyed, for example, 20% of the right tokens should be destroyed for each of the right holder hosts 102*a* and 102*b*. However, when some rights are transferred/traded or destroyed (such as entitlement in advance) for various reasons, it results in an uneven distribution of the remaining right tokens 400 among the right holder hosts 102*a* and 102*b*, the decrease in rights is the same for each holder. In practice, the first right and obligation symmetry module 112 and the second right and obligation symmetry module 123 call each other to achieve the symmetry between right and obligation. It should be noted that the destruction of the obligation tokens 301*a* and 301*b* needs to be executed by the right token contract 120 because the ownerships of the obligation tokens 301*a* and 301*b* belong to the right token contract 120. Therefore, the right token contract 120 can authorize/execute the destruction of the obligation tokens 301*a* and 301*b* based on the consensus decision of the right holder hosts 102*a* and 102*b*. In addition, in the risk-sharing scenario, a rule can be set in the second right and obligation symmetry module 123 of the right token contract 120, such that when the obligations decrease, the rights are not evenly destroyed. For example, the right tokens held by the original obligation provider hosts can be destroyed first, and when the quantity of the destroyed right tokens is insufficient, the remaining quantity of the right tokens to be destroyed can be evenly distributed among the M right holder hosts 102*a* and 102*b*. It should be noted that the starting point for the destruction of the obligation tokens 301*a* and 301*b* is the right token contract 120 because the ownership of the obligation tokens 301*a* and 301*b* belongs to the right token contract 120, and the right tokens 400 managed by the right token contract 120 are automatically controlled to be destroyed.

Figure 6:
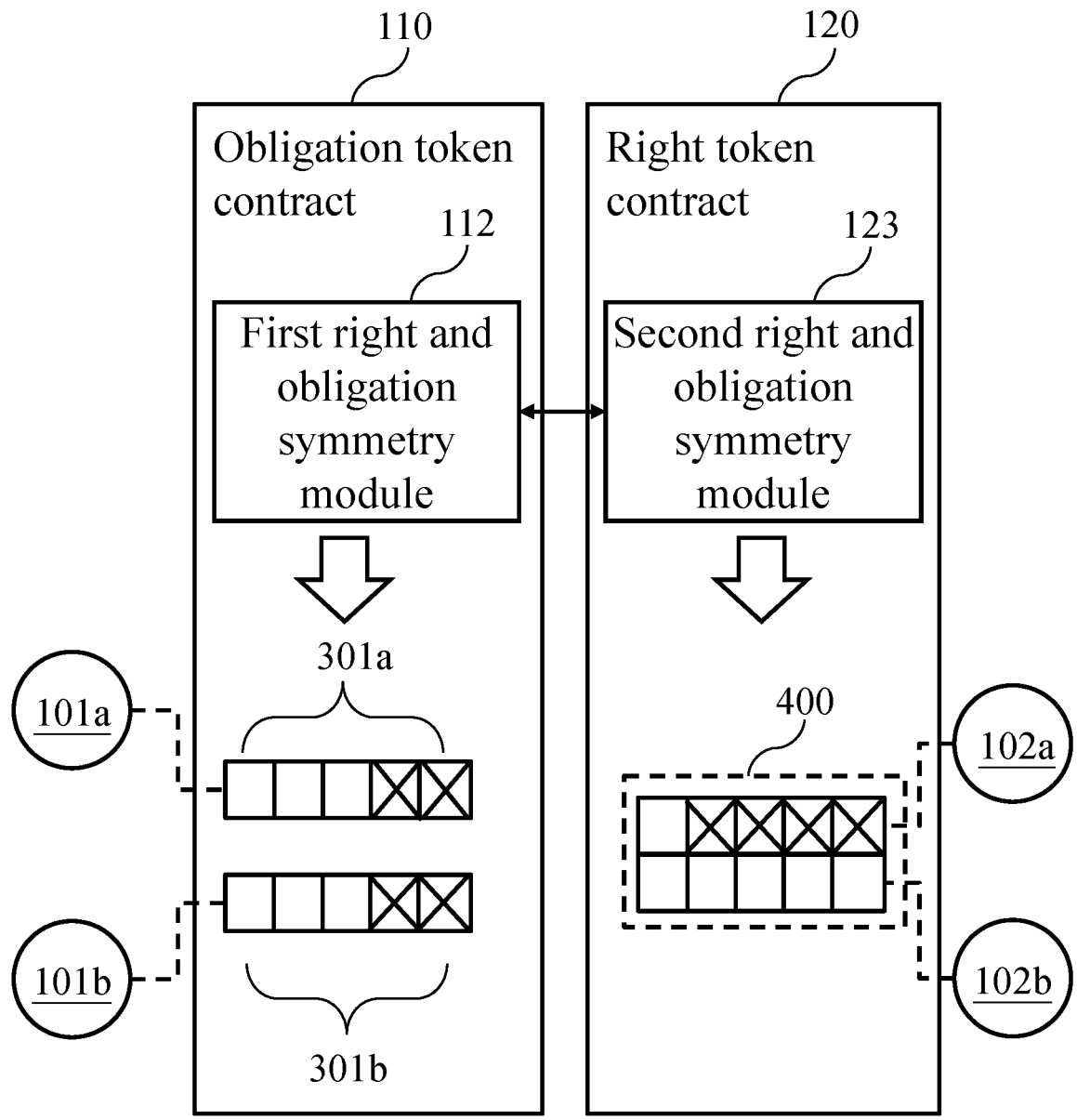
FIG. 6 is a schematic view illustrating a second embodiment of the symmetric relationship between right and obligation tokens in the application of the present invention.

Please refer to FIG. 6. FIG. 6 is a schematic view illustrating a second embodiment of the symmetric relationship between right and obligation tokens in the application of the present invention. In a condition that there are two obligation provider hosts 101*a* and 101*b* and two right holder hosts 102*a* and 102*b*, in the case of a decrease in rights resulting in a decrease in average obligations, the obligation tokens are decreased based a ratio, but not a fixed value. For example, each of the obligation provider hosts 101*a* and 101*b* destroys 40% of the corresponding obligation tokens thereof. However, if some obligations are destroyed for various reasons (such as early performance or partial default), and it results in an uneven distribution of the remaining obligations among the obligation provider hosts 101*a* and 101*b*, the decrease in obligations is not the same for each provider. It should be noted that holders of the right tokens 400 are the right holder hosts 102*a* and 102*b*, so the starting point for destruction can be executed by the right holder hosts 102*a* and 102*b*; the obligation tokens 301*a* and 301*b* are owned by the right token contract 120, so the right token contract 120 needs to destroy the held obligation tokens 301*a* and 301*b* proportionally based on the destroyed right tokens 400.

Figure 7:
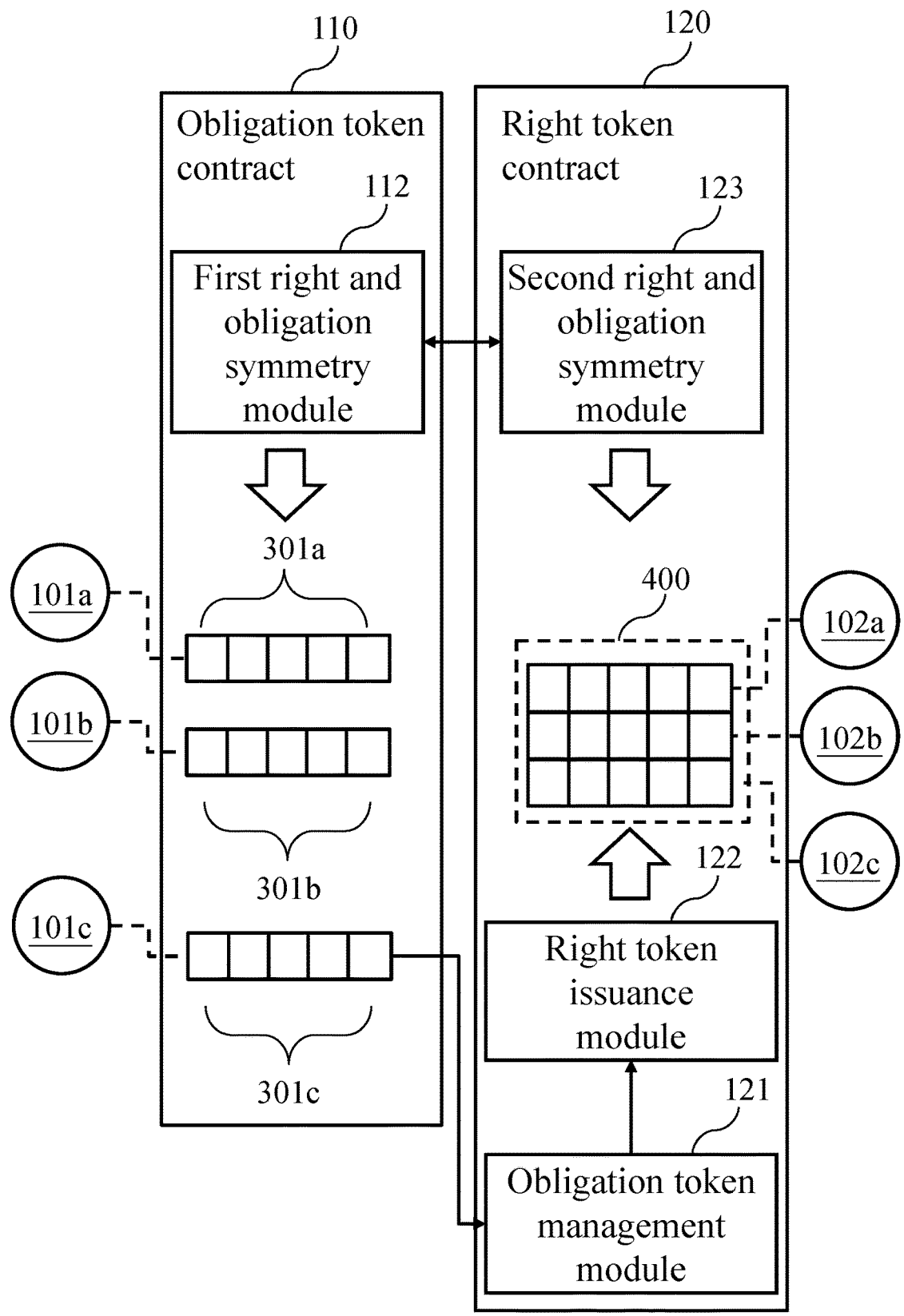
FIG. 7 which is a schematic view illustrating a third embodiment of the symmetric relationship between right and obligation tokens in the application of the present invention.

Please refer to FIG. 7. FIG. 7 which is a schematic view illustrating a third embodiment of the symmetric relationship between right and obligation tokens in the application of the present invention. Assuming that in the above example, due to the addition of obligations and rights, a new obligation provider host 101*c* and a new right holder host 102*c* are added. At this time, the obligation provider host 101*c* calls the obligation token contract 110 to generate the corresponding quantity of obligation tokens 301*c*, and calls the obligation token management module 121 to transfer the obligation tokens 301*c* to the right token contract 120, so that the right token issuance module 122 of the right token contract 120 can issue and deliver a symmetric quantity of the right tokens 400 to the right holder host 102*c*. It should be noted that the obligation provider host 101*c* can be either an original obligation provider host or a newly added host, and the right holder host 102*c* can also be the obligation provider host 101*c*. In addition, since the addition of obligation tokens and right tokens affects the existing rights distribution, the consensus decision of the right holder hosts 102*a*~102*c* can be required for the execution of the addition of obligation tokens and right tokens if necessary.

Figure 8:
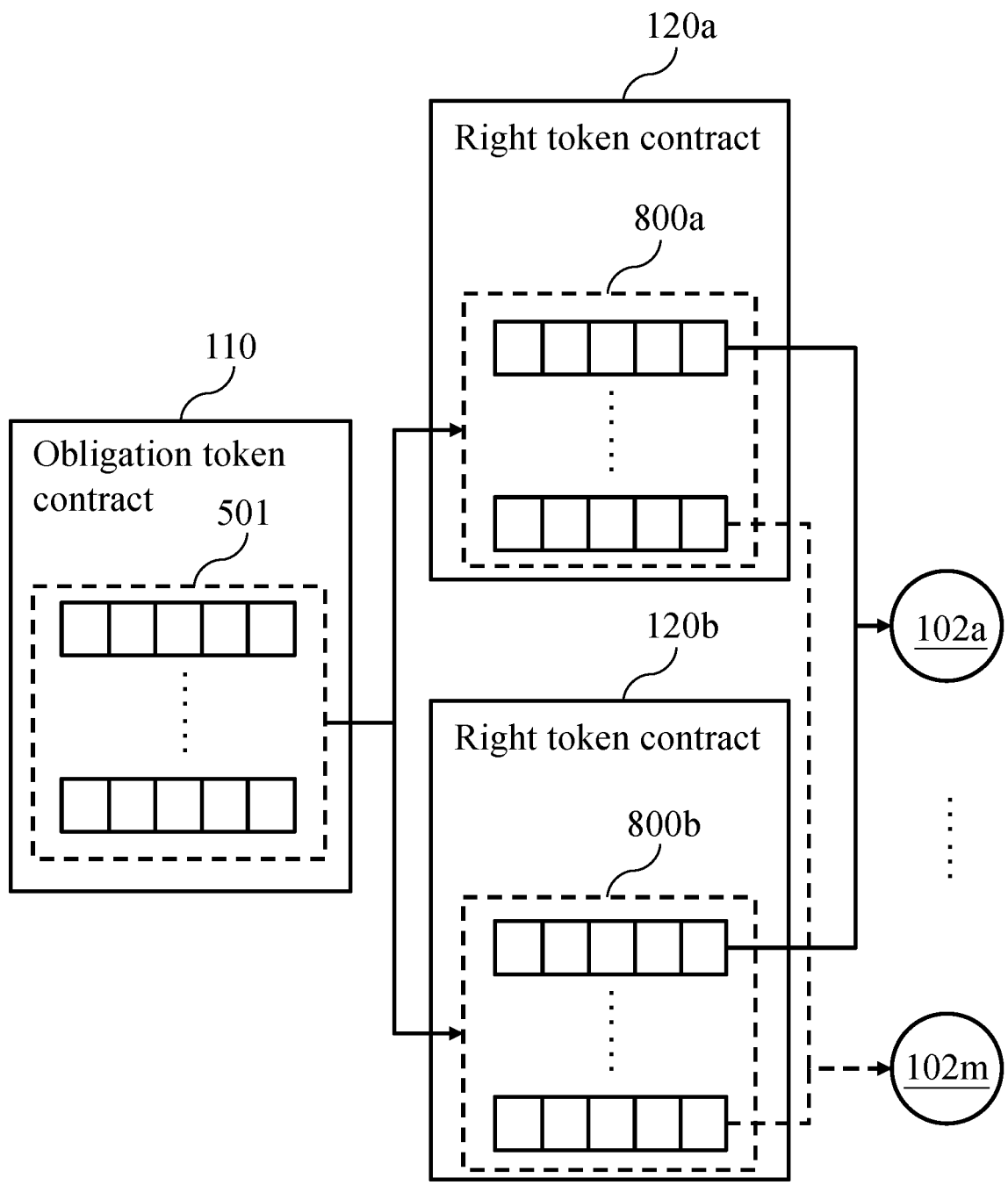
FIG. 8 is a schematic view illustrating the one-to-many relationship between right and obligation tokens in the application of the present invention.

Please refer to FIG. 8. FIG. 8 is a schematic view illustrating the one-to-many relationship between right and obligation tokens in the application of the present invention. In practice, the obligation tokens and right tokens can have a one-to-many relationship, as shown in FIG. 8, where one obligation token 501 corresponds to multiple right tokens 800*a* and 800*b*. In this case, when the rights are destroyed, the corresponding obligations are also destroyed in average, just like in the one-to-one case. When the obligations are destroyed, the corresponding rights are also evenly destroyed. In the obligation token contract 110, the first right and obligation symmetry module 112 can be set with a rule such as requiring the destruction of corresponding quantity of right tokens based on a proportion of the obligation tokens held in the contract. Alternatively, a priority can be set in the right token contracts 120a and 120b for sequentially requesting the destruction of right tokens 800a and 800b based on the set priority. For example, only after all the right tokens 800a in the right token contract 120a have been completely destroyed, the right token contract 120b is requested to destroy the right tokens 800b.

Based on the above explanation, in practical applications, in the scenario of a rotating savings and credit association, the obligation provider hosts 101a~101n can be considered as participants in the rotating savings and credit association, and the right holder hosts 102a~102m can also be considered as participants in the rotating savings and credit association. Each unit of obligation tokens 301a~301n represents the obligation (corresponding to the payment/quantity) of each participant to pay the association fee for each period, and each unit of right token 400 represents the right (corresponding to payment/quantity) of a participant to receive the association fee for one period. The practical process is as follows.

(1) In a condition that there are 10 participants in the rotating savings and credit association with a total of 10 periods and an association fee of 1000 units per period, each participant in the rotating savings and credit association operates a corresponding one of the obligation provider hosts 101a~101n to call the obligation token contract 110 to recognize a payment obligation, which is 10,000 units in total (10 periods×1,000 units). The obligation token issuance module 111 issues various obligation tokens 301a~301n (from different participants in the rotating savings and credit association) based on the above-mentioned operations, and collectively delivers the obligation tokens to the obligation token management module 121 of the right token contract 120, that is, the obligation tokens 301a~301n are issued to the right token contract 120.

(2) After receiving the obligation tokens 301a~301n from various participants in the rotating savings and credit association, the right token contract 120 issues a symmetrical quantity of right tokens 400 (100,000 units) based on the total quantity of obligations (10 participants×10,000 units) across various sources. In the scenario of rotating savings and credit association, the right tokens 400 are allocated to the obligation provider hosts 101a~101n; that is, the right tokens 400, representing the right to withdraw fund, are delivered to the participants who originally recognized the payment obligation; at this stage, the obligation provider hosts 101a~101n also act as the right holder hosts 102a~102m, and the quantity of obligation tokens held by one of the obligation provider hosts 101a~101 is symmetrical to the quantity of right tokens allocated to the one of obligation provider hosts 101a~101; that is, each participant receives 10,000 units (rights). In other words, at this stage, the right token contract 120 issues and allocates the right tokens 400.

(3) The participants in the rotating savings and credit association operate the obligation provider hosts 101a~101n, respectively, and their recognized obligation tokens 301a~301n are held and managed by the right token contract 120. At the same time, the obligation provider hosts 101a~101n of the participants also function as the right holder hosts 102a-102m holding right tokens with a quantity symmetrical to that of recognized obligations, and the right tokens represent the participant's right to withdraw fund. At this stage, the obligation tokens 301a~301n and the right tokens 400 are in a stable holding state.

(4) During the process of the above-mentioned rotating savings and credit association, there may be three types of behaviors.

(4.1) A participant in the rotating savings and credit association quits and no longer fulfills their obligation, it can be considered that the obligation tokens from this participant are invalidated and should be destroyed, and at the same time, an equal quantity of right tokens must be destroyed. In this scenario, it can be prioritized to destroy the right tokens of this obligation provider host, that is, prioritizing the destruction of right tokens from the source address of this participant who quits the association. When the destruction quantity is insufficient, an equal portion of right tokens of each of other participants is destroyed to meet the symmetry, that is, the destruction of obligation tokens should be symmetrical to the destruction of right tokens. The action of quitting the association may affect the interests of all other participants in the rotating savings and credit association, so a consensus decision mechanism can be added to allow the destruction to proceed. For example, when a participant A quits the association after paying the association fee for one period and receiving the total association fee for that period (consuming 10,000 units of right tokens), the participant A has an obligation for the remaining 9 periods, which is 9×1000 units (obligation), but has 0 unit of right token, so when the right token contract 120 destroys the 9,000 units of obligation tokens from the participant A, it also destroys an equal portion (9,000/9=1,000 units) of right tokens from the remaining 9 participants. For example, when a participant B quits the association after paying the association fees for three periods but not receiving any total association fee (consuming 0 unit of right token) and decides to quit the association, the participant B has an obligation for the remaining 7 periods, which is 7×1,000 units (obligation), and has right tokens remain at 10,000 units. When the right token contract 120 destroys the 7,000 units of obligation tokens from the participant B, the right token contract 120 first prioritizes the destruction of 7,000 units of right tokens from the participant B's remaining 10,000 units, so the participant B retains 3,000 units of right tokens.

(4.2) A participant in the rotating savings and credit association wants to receive the total association fee for a specific period, all other participants pay the association fees for that period to fulfill portions of their respective obligations, and an equal quantity of obligation tokens of each of all other participants is destroyed. The participant who receives the total association fee fulfills the rights, so the corresponding quantity of right tokens is also destroyed, that is, when the right tokens are destroyed, the obligation tokens should be destroyed symmetrically. In practical implementation, since the action of receiving the total association fee has a time interval limit, a time interval regulation can be added to the contract. For example, when a participant A wants to receive the total association fee (10,000 units) for one period, and there are 10 participants, each participant pays 1,000 units for that period and 10000 unit are collectively delivered to the participant A. At this point, each participant fulfills his/her obligation of 1,000 units, and the participant A fulfills the right of 10,000 units. Therefore, the right token contract 120 destroys 1,000 units of obligation tokens of each of the participants and 10,000 units of right tokens of the participant A.

(4.3) When a new participant wants to join the rotating savings and credit association or an existing participant wants to increase the contribution thereof, he/she can recognize a designated quantity of payment obligation, and the obligation token contract 110 issues obligation tokens from the source of this participant to the right token contract 120, and the right token contract 120 symmetrically issues right tokens, representing the right to withdraw, to this participant (that is, symmetrical issuance of obligation and right tokens). The additional issuance may affect the interests of existing participants, so a consensus decision mechanism can be added to allow the additional issuance to proceed. For example, when a new participant X wants to join as the 11th participant, the participant X can recognize an obligation of 10,000 units and receive 10,000 units of right tokens, the total number of periods in the rotating savings and credit association becomes 11, the total obligation and rights become 110,000 units, but the total obligation and rights for each participant in the rotating savings and credit association remain at 10,000 units.

It should be noted that an adjustment rule can be added in the order of destroying right tokens to obtain profit, to meet the mechanism where the later withdrawal can obtain higher profit. For example, the same withdrawal rights destroyed in a range of the initial period to the last period can obtain fund in a range of 0.9 times to 1.1 times, that is, 1,000 units of obligation in the first period corresponds to 1,000×0.9 fund and 10,000 units of rights correspond to 10,000×0.9 fund, and 1,000 units of obligation in the 10th period corresponds to 1,000×1.1 fund and 10,000 units of rights correspond to 10,000×1.1 fund.

A scenario of risk sharing association, such as C2C or P2P mutual guarantee association, will be described in the following paragraphs. In this scenario, the obligation provider hosts 101*a*~101*n* can be considered to participate as mutual guarantors, and the right holder hosts 102*a*~102*m* can be considered to participate as mutual guarantors. Each unit of obligation tokens 301*a*~301*n* represents the obligation of the mutual guarantor to pay for insurance in response to other mutual guarantor's request. Each unit of right tokens 400 represents the right of mutual guarantor to receive mutual-guarantee payments from other mutual guarantor. The actual process is as follows.

(1) In a condition that there are 50 participants in the risk sharing association with a maximum assistance quantity of 10,000 units, the 50 participants (as mutual guarantors) are considered as the obligation provider hosts 101*a*~101*n* and can call the obligation token contract 110 to recognize the payment obligation as 10,000 units equal to the maximum assistance quantity. The obligation token issuance module 111 issues 50 types of obligation tokens 301*a*~301*n* from 50 sources (that is, 50 participants) and delivers the obligation tokens 301*a*~301*n* to the obligation token management module 121 of the right token contract 120. In this stage, the obligation tokens 301*a*~301*n* are issued to the right token contract 120.

(2) The right token contract 120 receives the obligation tokens 301*a*~301*n* from various sources (that is, various participants) in the risk sharing association and issues right tokens 400 having a quantity symmetrical to the total quantity of obligation tokens across sources (that is, 500,000 units=50 types×10,000 units). In the risk sharing association scenario, the right tokens 400 are distributed to the obligation provider hosts 101*a*~101*n*, and the right tokens 400, representing the right to withdraw, are delivered to the participants who originally recognized the payment obligation. At this stage, the obligation provider hosts 101*a*~101*n* also act as the right holder hosts 102*a*~102*m*, and the quantity of the obligation tokens from the obligation provider hosts 101*a*~101*n* is symmetrical to the quantity of right tokens allocated to the obligation provider hosts 101*a*~101*n*, that is, each mutual guarantor obtains 10,000 units of right tokens equal to the maximum assistance quantity. In this stage, the right token contract 120 issues and allocates right tokens 400.

(3) The participants in the risk sharing association are considered as the obligation provider hosts 101*a*~101*n*, and their recognized obligation tokens 301*a*~301*n* are held and managed by the right token contract 120. The participants can also be considered as the right holder hosts 102*a*~102*m* and holds the right tokens 400 having a quantity symmetrical to the quantity of recognized obligations, the right tokens 400 indicate the right to withdraw. In this stage, the obligation tokens 301*a*~301*n* and right tokens 400 are in a stable holding state.

(4) In the process of the risk sharing association, there may be the following three types of behaviors.

(4.1) One of the participants may quit from the risk sharing association and refuse to fulfill his/her obligations, the obligation tokens from the one of the participants should be considered invalidated and should be destroyed. At the same time as destroying the above-mentioned obligation tokens, an equal quantity of right tokens should also be destroyed. In this scenario, the right tokens of this obligation provider host can be prioritized for destruction, and it means the right tokens held by the address of the one of the participants can be destroyed first; when the quantity to be destroyed is not sufficient, an equal quantity of right tokens from all other participants can be destroyed to meet the symmetry, that is, the destroyed obligation tokens needs to be symmetrical with the destroyed right token. The participant's quitting behavior may affect the interests of all other participants, so a consensus decision mechanism can be added to allow for destruction. For example, when a participant A quits from the risk sharing association after sharing 1,000 units of risk and receiving 5,000 units of assistance (that is, the participant A consumes the rights), since the participant A still has 9,000 units of obligations remaining, but only have 5,000 units of remaining rights; when the 9,000 units of the obligation tokens from the participant an are destroyed according to the right token contract 120, the remaining 5,000 units of right tokens of the participant A should be destroyed first, and at the same time, an equal quantity of right tokens (that is, 4,000/49 units) of each of the remaining 49 participants should be destroyed. In an example, a participant B shared 3,000 units of risk but did not receive any assistance (consumed rights); when the participant B wishes to quit from the risk sharing association, since the participant B still has an obligation of 7,000 units remaining and 10,000 units of rights, when the obligation token of 7,000 units from the participant B are destroyed according to the right token contract 120, the remaining 10,000 units of rights from the participant B should be destroyed first. The participant B will still retain 3,000 units of right tokens.

(4.2) When one of the participants experiences a risk and wants to receive the support which he/she is entitled to all participants share the payment of the risk sharing quantity, to fulfill a portion of their respective obligations, and the corresponding quantity of obligation tokens are simultaneously destroyed. When receiving the support payment, the one of the participants fulfills the right to receive support, so the corresponding right tokens 400 are also destroyed (that is, destroying right tokens requires in symmetry with the destroyed obligation tokens). For example, when a participant A wants to receive a support payment of 5,000 units and there are 50 participants, each participant provides a support fee of 100 units, so the support fee of 5,000 units are collected to the participant A; at this time, each participant fulfills the obligation of 100 units, and the participant A fulfilled the right of 5,000 units, so the right token contract 120 destroys each participant's obligation tokens of 100 units and the participant A's right tokens of 5,000 units.

(4.3) When a new participant wants to join the risk sharing association or an existing participant wants to increase the insurance coverage, the new participant or the existing participant can recognize a designated quantity of payment obligation, the obligation token contract 110 issues additional obligation tokens from this participant's source to the right token contract 120. The right token contract 120 symmetrically issues the right tokens 400 representing withdrawal rights, to this participant; that is, the obligation tokens and right tokens are symmetrically issued. The process of issuing additional tokens may affect the interests of existing participants, so a consensus decision mechanism can be added to allow for the additional issuance. For example, when a new participant X wants to join this association as the 51st person after the risk sharing association has been running for some time, the participant X can recognize an obligation of 10,000 units and receive 10,000 units of rights. Assuming that there are already 390,000 units of obligations and rights within the risk sharing association before the addition, the total obligation becomes 400,000 units, and the total rights also symmetrically become 400,000 units. The remaining obligations and rights of the other participants, except for the new participant, remain unchanged.

A scenario of loan securitization, such as mortgage backed securities (MBS), will be described in the following paragraphs. In this scenario, the obligation provider hosts 101a~101n can be considered as mortgage loan debtors, and the right holder hosts 102a~102m can be considered as investors after the loan securitization. Each unit of obligation tokens 501 represents the debt obligation that the debtor must repay. The debt obligation may be principal or principal plus interest. Each unit of right tokens 800a and 800b represents the right of the investor to receive repayment, which may be principal or principal plus interest. The actual process is as follows.

(1) Multiple mortgage loan debtors are considered as the obligation provider hosts 101a~101n to obtain loans from investors or intermediaries and call the obligation token contract 110 to recognize the repayment obligation. The obligation token issuance module 111 issues multiple obligation tokens 501 from different debtor sources, and collectively delivers the obligation tokens 501 to the obligation token management module 121 of the right token contract 120 that issues the obligation tokens 501 to the right token contract 120. For example, when there are 100 mortgage loan debtors who recognize a total repayment obligation of 50,000,000 units to the obligation token contract 110, 50,000,000 units of obligation tokens 501 of different types in total are issued.

(2) The obligation token contract 110 corresponds to two different levels of right token contracts 120a and 120b. For example, the right token contract 120a is for a contract A, and the right token contract 120b is for a contract B, it specifies that when it is determined to destroy the obligation tokens 501, the right tokens 800b of the contract B should be destroyed first, and 10,000,000 units of repayment obligation tokens should be delivered to the contract A, and 40,000,000 units of repayment obligation tokens should be delivered to the contract B. When the right token contract 120a receives 10,000,000 units of repayment obligation tokens of different types from various debtor sources, the right token contract 120a issues a symmetric quantity of right tokens (that is, 10,000,000 units of right tokens 800a) and distribute the right tokens to the investors. When the right token contract 120b receives 40,000,000 units of repayment obligation tokens from various debtor sources, the right token contract 120b issues a symmetric quantity of right tokens, that is, 40,000,000 units of right tokens 800b, which are distributed to the investors.

(3) The debtors are considered as the obligation provider hosts 101a~101n respectively, and their recognized obligation tokens are held and managed by the right token contracts 120a and 120b. The investors can be considered as the right holder hosts 102a~102m respectively and hold the right tokens 800a and 800b, representing their rights to receive repayment and interest as income, in a stable state of holding obligations/rights.

(4) During the process of the mortgage loan system, there may be three types of behaviors.

(4.1) When a debtor abandons repayment and quits the mortgage loan system and no longer fulfilling the obligations, it can be considered that the obligation tokens from this source (this debtor) are invalidated and should be destroyed. When the obligation tokens from this debtor are destroyed, an equal quantity of right tokens must also be destroyed to maintain symmetry, that is, when the obligation is destroyed, corresponding right tokens are also destroyed. The abandonment of repayment may affect the interests of other investors, so a consensus decision mechanism can be introduced to allow for the destruction. For example, in a condition that a debtor an originally recognized 100,000 units of repayment obligation tokens and the debtor A crashes and abandons repayment after repaying 10,000 units of debt, since the debtor A still has 90,000 units of obligations remaining, when the contract B still has more than 90,000 units of right tokens 800b and 90,000 units of repayment obligation tokens are destroyed from the debtor A, an equal proportion of right tokens 800b held by all investors should be destroyed. For example, when an investor X holds 1/1000 of the total right tokens 800b, the quantity of the right tokens 800b of the investor X to be destroyed is 90,000/1000 units. In another example, when a debtor B originally recognized 5,000,000 units of repayment obligations, and crashes and abandons repayment after repaying 1,000,000 units of debt, since the debtor B still has 4,000,000 units of obligations remaining, if there are only 3,000,000 units of right tokens 800*b* left, when 4,000,000 units of repayment obligation tokens from the debtor B are destroyed, an equal proportion of right tokens 800*b* held by all investors should be destroyed. For example, when an investor X holds 1/1000 of the total right tokens 800*b*, the quantity of the right tokens 800*b* of the investor X to be destroyed is 3,000,000/1000 units. The equal proportion of right tokens 800*a* held by all investors should be destroyed, to make 1,000,000 units of right tokens 800*a* in total be destroyed. For example, when an investor Y holds 1/2000 of the total right tokens 800*a*, a quantity of the right tokens 800*a* of the investor Y to be destroyed is 1,000,000/2000 units. In the actual implementation, in a condition that the destruction rules for multiple right token contracts are changed to be non-sequential and instead based on the proportion of obligation tokens held, when 5 units of obligations need to be destroyed, the contract A would be required to destroy 1 unit of right tokens, and the contract B would be required to destroy 4 units of right tokens.

(4.2) When an investor wants to receive repayment for a specific period, and all debtors make the payment for that period to fulfill a portion of their respective obligations, the corresponding obligation tokens must be destroyed. When an investor receives repayment and exercises the rights, the corresponding right tokens are also to be destroyed, that is, the right tokens is destroyed symmetrically to the destroyed obligation tokens. The behavior of receiving repayment must have the repayment as the source. For example, when an investor A wants to receive a return of 10,000 units of right tokens 800*b*, the contract B can destroy a total of 10,000 units of repayment obligation tokens based on the proportion of obligations held from the sources, and destroy the 10,000 units of right tokens 800*b* held by the investor A. The prerequisite for destroying the repayment obligation tokens is that the debtors as the source of the obligation tokens have fulfilled the repayment obligations. For example, when a debtor X repays 1,000 units of debt, the repayment obligation tokens from the debtor X can be destroyed by 1,000 units.

(4.3) When a new debtor and a new investor want to join the loan securitization system, the new debtor can recognize a designated quantity of repayment loan obligations, the obligation token contract 110 issues additional obligation tokens from this debtor source to the right token contract 120. The right token contract 120 symmetrically issues right tokens representing income rights to the new investor, that is, symmetric issuance of obligation and right tokens. The issuance process may affect the interests of existing participating investors, so a consensus decision mechanism can be introduced to allow for the issuance. For example, when a new debtor A wants to join as a new debtor after the loan securitization system has been running for some time, the new debtor A can recognize 1,000,000 units of repayment obligations to obtain a loan from a new investor X, the total repayment obligation tokens increase by 1,000,000 units, and the total right tokens also symmetrically increase by 1,000,000 units. The increased right tokens are delivered to the new investor X, who provides the loan. In this case, there may be multiple investors providing loans, and the income right tokens can be allocated proportionally based on the proportion of loans provided.

It is noted that in this loan securitization scenario, to accommodate the mechanism of interest payments in typical loans and the ability for investors to earn interest, the obligation to pay interest can be included in the securitization process. The obligations represent the total quantity of principal and interest to be repaid, while the rights represent the ability to redeem the principal and interest. A buffer mechanism can be added to the right token contract to allow for the destruction of obligations and right tokens to occur after the actual repayment, and the buffer time corresponds to the desired redemption time for the securities holders. Additionally, to accommodate common grading/classification mechanisms in loan securitization, the obligation token contract 110 can correspond to multiple graded/classified right token contracts 120*a* and 120*b*. The obligation tokens would be allocated to multiple right token contracts 120*a* and 120*b* for management, and one of the right token contracts 120*a* and 120*b* can only issue one of right tokens 800*a* and 800*b* symmetrically to the quantity of obligation tokens it receives. The first right and obligation symmetry module 112 of the obligation token contract 110 would specify the rules for rights destruction, such as based on the proportions of obligation tokens held by the right token contracts 120 or sequentially requiring destruction from multiple right token contracts 120*a* and 120*b*, for example, only when all right tokens 800*a* issued by the first right token contract 120*a* are destroyed, the destruction of right tokens 800*b* issued by the second right token contract 120*b* is performed.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A symmetrical issuance and destruction system for right and obligation tokens, comprising:
   a blockchain network, comprising node hosts, wherein N obligation provider hosts and M right holder hosts are permitted to access the blockchain network and perform identification and right transfer through blockchain addresses thereof, wherein each of N and M is a positive integer, and each of the node hosts comprises:
   at least one processor;
   a storage element configured to store a distributed ledger; and
   a plurality of smart contracts, wherein each of the plurality of smart contracts comprises an obligation token contract and at least one right token contract, each of the obligation token contract and at least one right token contract comprises computer instructions, and the plurality of smart contracts are stored in the distributed ledger and executed by the at least one processor;
   wherein the obligation token contract comprises:
   an obligation token issuance module, wherein when the N obligation provider hosts call the obligation token issuance module, the obligation token issuance module issues at least one obligation token representing obligation, and deliver the at least one issued obligation token to the right token contract for holding and management; and
   a first right and obligation symmetry module, configured to destroy the issued obligation token or issue more obligation token for maintaining symmetry between a quantity of the issued obligation token in the obligation token contract and a quantity of at least one issued right token in the right token contract;

wherein the right token contract comprises:

an obligation token management module, connected to the obligation token contract, wherein the obligation token contract calls the obligation token management module to transfer the obligation token to the right token contract;

a right token issuance module, connected to the obligation token management module, wherein the obligation token management module calls the right token issuance module to issue the right tokens having a quantity with symmetry to the quantity of the obligation token received by the right token contract, and deliver the issued right token to at least one of the M right holder hosts; and a second right and obligation symmetry module, wherein the second right and obligation symmetry module and the first right and obligation symmetry module are configured to call with each other to continuously destroy the issued right tokens and issue more right tokens for maintaining symmetry between a quantity of the issued obligation token in the obligation token contract and a quantity of at least one issued right token in the right token contract.

2. The symmetrical issuance and destruction system for right and obligation tokens according to claim 1, wherein maintaining symmetry between the quantity of the issued obligation token in the obligation token contract and the quantity of at least one issued right token in the right token contract comprises one of increasing the obligation token and the right token with symmetry, destroying the right tokens held by the M right holder host in average corresponding to the obligation token, and destroying the obligation token in average corresponding to the right token.

3. The symmetrical issuance and destruction system for right and obligation tokens according to claim 1, wherein the obligation token contract is permitted to correspond to the multiple right token contracts, and each of the multiple right token contracts comprises a symmetry destruction rule, to make obligation token contract allocate or sort the right token contracts according to the symmetry destruction rules and the obligation token contract permits to deliver the obligation tokens of different types to the multiple right token contracts in average.

4. The symmetrical issuance and destruction system for right and obligation tokens according to claim 1, wherein one of the N obligation provider hosts and one of the M right holder hosts are permitted to have the same blockchain address, and the right tokens are distributed to the N obligation provider hosts based on a classification ratio of the right tokens, to make the N obligation provider hosts become the M right holder host at the same time.

5. The symmetrical issuance and destruction system for right and obligation tokens according to claim 1, wherein when the obligation tokens decreases, the second right and obligation symmetry module is permitted to destroy the right token of the original obligation provider host first, and when the quantity of the destroyed right token is lower than the quantity of the right token that should be destroyed, the second right and obligation symmetry module destroys the remaining quantity of the right token to be destroyed of the M right holder hosts in average.

6. A symmetrical issuance and destruction method for right and obligation tokens, comprising:

providing a blockchain network comprising a node hosts, permitting N obligation provider hosts and M right holder hosts to access the blockchain network and perform identification and right transfer through blockchain addresses thereof, wherein each of the node hosts comprises at least one processor, a distributed ledger stored in a storage element, and an obligation token contract and at least one right token contract which are stored in the distributed ledger and comprises computer instructions, wherein each of N and M is a positive integer;

calling the obligation token contract to issue at least one obligation token representing obligation and deliver the issued obligation tokens to the right token contract for holding and management, by the N obligation provider hosts;

issuing at least one right token having a quantity symmetrical to a quantity of the received obligation tokens and delivering the issued at least one right token to at least one of the M right holder hosts, by the right token contract; and continuously destroying the issued obligation token or issuing more the obligation token to maintain symmetry between the quantity of the issued obligation tokens in the obligation token contract and the quantity of the at least one issued right token in the right token contract, and continuously destroying the issued right token or issuing more the right token to maintain symmetry between the quantity of the issued obligation tokens in the obligation token contract and the quantity of the at least one issued right token in the right token contract.

7. The symmetrical issuance and destruction method for right and obligation tokens according to claim 6, wherein maintaining symmetry between the quantity of the issued obligation token in the obligation token contract and the quantity of at least one issued right token in the right token contract comprises one of increasing the obligation token and the right token with symmetry, destroying the right tokens held by the M right holder host in average corresponding to the obligation token, and destroying the obligation token in average corresponding to the right token.

8. The symmetrical issuance and destruction method for right and obligation tokens according to claim 6, wherein the obligation token contract is permitted to correspond to the multiple right token contracts, and each of the multiple right token contracts comprises a symmetry destruction rule, to make obligation token contract allocate or sort the right token contracts according to the symmetry destruction rules and the obligation token contract permits to deliver the obligation tokens of different types to the multiple right token contracts in average.

9. The symmetrical issuance and destruction method for right and obligation tokens according to claim 6, wherein one of the N obligation provider hosts and one of the M right holder hosts are permitted to have the same blockchain address, and the right tokens are distributed to the N obligation provider hosts based on a classification ratio of the right tokens, to make the N obligation provider hosts become the M right holder host at the same time.

10. The symmetrical issuance and destruction method for right and obligation tokens according to claim 6, wherein when the obligation tokens decreases, the second right and obligation symmetry module is permitted to destroy the right token of the original obligation provider host first, and when the quantity of the destroyed right token is lower than the quantity of the right token that should be destroyed, the second right and obligation symmetry module destroys the remaining quantity of the right token to be destroyed of the M right holder hosts in average.

\* \* \* \* \*